United States Patent
Martin et al.

(10) Patent No.: US 8,967,418 B2
(45) Date of Patent: Mar. 3, 2015

(54) PROCESS FOR MANUFACTURING A FUEL TANK AND USE THEREOF IN A HYBRID VEHICLE

(75) Inventors: Philippe Martin, Moxhe (BE); Serge Dupont, Vilvoorde (BE); Bjorn Criel, Sint-Martens-Lennik (BE)

(73) Assignee: Inergy Automotive Systems Research S.A., Brussels (BE)

(*) Notice: Subject to any disclaimer, the term of this patent is extended or adjusted under 35 U.S.C. 154(b) by 0 days.

(21) Appl. No.: 13/583,799

(22) PCT Filed: Mar. 7, 2011

(86) PCT No.: PCT/EP2011/053377
§ 371 (c)(1),
(2), (4) Date: Oct. 25, 2012

(87) PCT Pub. No.: WO2011/110519
PCT Pub. Date: Sep. 15, 2011

(65) Prior Publication Data
US 2013/0037549 A1 Feb. 14, 2013

(30) Foreign Application Priority Data

Mar. 9, 2010 (FR) ...................................... 10 51692
Sep. 15, 2010 (FR) ...................................... 10 57373

(51) Int. Cl.
*B29C 65/14* (2006.01)
*B29C 65/02* (2006.01)
(Continued)

(52) U.S. Cl.
CPC . *B29C 65/14* (2013.01); *F17C 1/16* (2013.01); *B29C 65/02* (2013.01);
(Continued)

(58) Field of Classification Search
CPC ............... F17C 1/16; F17C 1/12; F17C 1/06; F17C 1/04; F17C 1/02; F17C 1/005; F17C 2203/0636; F17C 2203/0663; F17C 2203/0665; F17C 2203/0648
USPC ........ 220/589, 588, 586; 156/245; 180/65.21; 206/0.6; 428/36.3, 36.1, 35.7
See application file for complete search history.

(56) References Cited

U.S. PATENT DOCUMENTS 2,372,723 A * 4/1945 McLean ........................... 29/446
2,718,583 A * 9/1955 Noland et al. ................. 392/458
(Continued)

FOREIGN PATENT DOCUMENTS

CN 2398129 Y 9/2000
EP 0 755 769 A1 1/1997
(Continued)

OTHER PUBLICATIONS

Translation of FR 2898549 (Lesschaeve et al.) Sep. 21, 2007, pp. 2, 5-7, and 12.*
(Continued)

*Primary Examiner* — Robert J Hicks
(74) *Attorney, Agent, or Firm* — Oblon, McClelland, Maier & Neustadt, L.L.P.

(57) ABSTRACT

A process for manufacturing a fuel tank including a thermoplastic wall and a fibrous reinforcement on at least one portion of its outer surface, according to which: a molten thermoplastic parison is molded in a mold and is left to cool in order to obtain a wall of the tank; a fibrous reinforcement is chosen that includes a thermoplastic similar to or compatible with that of the wall of the tank and the reinforcement is heated so as to soften or even melt the thermoplastic of the reinforcement; and the reinforcement is applied to an outer surface of the tank by exerting a force that makes it possible to weld the reinforcement and the outer surface.

23 Claims, 7 Drawing Sheets

(51) Int. Cl.
*B29C 65/00* (2006.01)
*F17C 1/16* (2006.01)
*F17C 1/06* (2006.01)
*B29C 65/16* (2006.01)
*B29K 101/12* (2006.01)
*B29K 105/06* (2006.01)
*B29K 309/08* (2006.01)
*B29L 9/00* (2006.01)
*B29L 31/00* (2006.01)
*B29C 65/78* (2006.01)

(52) U.S. Cl.
CPC ........ *B29C 65/1412* (2013.01); *B29C 65/1425* (2013.01); *B29C 65/1467* (2013.01); *B29C 65/16* (2013.01); *B29C 66/636* (2013.01); *B29C 66/721* (2013.01); *B29K 2101/12* (2013.01); *B29K 2105/06* (2013.01); *B29K 2223/065* (2013.01); *B29K 2309/08* (2013.01); *B29L 2009/00* (2013.01); *B29L 2031/7172* (2013.01); *B29C 65/7847* (2013.01); *B29C 66/5326* (2013.01)
USPC ............................ 220/589; 220/588; 156/245

(56) References Cited

U.S. PATENT DOCUMENTS

| | | | | |
|---|---|---|---|---|
| 2,744,043 | A * | 5/1956 | Ramberg | 156/155 |
| 3,240,644 | A * | 3/1966 | Wolff | 156/165 |
| 3,815,773 | A * | 6/1974 | Duvall et al. | 220/590 |
| 3,843,010 | A * | 10/1974 | Morse et al. | 220/590 |
| 4,225,051 | A * | 9/1980 | Faudou et al. | 220/590 |
| 5,020,687 | A | 6/1991 | Seizert | |
| 5,319,003 | A * | 6/1994 | Gomez et al. | 523/222 |
| 5,798,156 | A * | 8/1998 | Mitlitsky et al. | 428/35.9 |
| 6,866,812 | B2 * | 3/2005 | Van Schaftingen et al. | 264/515 |
| 7,032,769 | B2 * | 4/2006 | Iida et al. | 220/591 |
| 7,541,078 | B1 * | 6/2009 | Arritt et al. | 428/36.91 |
| 2002/0113694 | A1 | 8/2002 | Muirhead | |
| 2004/0040969 | A1 * | 3/2004 | DeLay et al. | 220/586 |
| 2008/0061466 | A1 * | 3/2008 | Cornwell et al. | 264/148 |
| 2008/0061470 | A1 | 3/2008 | Borchert et al. | |
| 2011/0016698 | A1 | 1/2011 | Borchert et al. | |
| 2012/0074028 | A1 | 3/2012 | Martin et al. | |

FOREIGN PATENT DOCUMENTS

| | | | |
|---|---|---|---|
| FR | 2 898 549 | 9/2007 | |
| JP | 57 199127 | 12/1982 | |
| JP | 1-113227 | 5/1989 | |
| JP | 2000-35196 | 2/2000 | |
| JP | 2000-266288 | 9/2000 | |
| JP | 2002-264669 | 9/2002 | |
| JP | 2003-97372 | 4/2003 | |
| JP | 2005-9559 | 1/2005 | |
| WO | WO 9720683 A1 * | 6/1997 | ............ B29D 22/00 |
| WO | 2008 061588 | 5/2008 | |

OTHER PUBLICATIONS

International Search Report Issued Apr. 11, 2011 in PCT/EP11/53377 Filed Mar. 7, 2011.
Chinese Office Action issued in Chinese Application No. 201180013265.X (English Translation).
Japanese Office Action issued in Patent Application No. 2012-556473 on Nov. 25, 2015 (w/ English translation).

* cited by examiner

PROCESS FOR MANUFACTURING A FUEL TANK AND USE THEREOF IN A HYBRID VEHICLE

The present invention relates to a process for manufacturing a fuel tank, and also to the use of a tank thus obtained in a hybrid engine vehicle.

Hybrid engine generally refers to the combination of a combustion engine and an electric motor.

There is a general operating principle for hybrid engines that consists in operating either the electric motor, or the combustion engine, or both at the same time, depending on the model.

One of the particular principles is as follows:
- during stationary phases (when the vehicle is stationary), both engines are shut down;
- at start-up, it is the electric motor which sets the car in motion, up to higher speeds (25 or 30 km/h);
- when higher speeds are reached, the combustion engine takes over;
- in the event of fast acceleration, both engines operate at the same time, which makes it possible to have accelerations equivalent to the engine of the same power, or even greater accelerations;
- in the decelerating and braking phase, kinetic energy is used to recharge the batteries (it should be noted that this functionality is not available in all the hybrid engines that are currently commercially available).

It results from this principle that the combustion engine does not operate constantly and that consequently, the purge phases of the canister (activated carbon filter that prevents fuel vapours being released to the atmosphere) cannot be carried out normally since during these purge phases, air, which is optionally preheated, is circulated through the canister in order to regenerate it (i.e. in order to desorb the fuel vapours that are adsorbed therein), this air then being admitted into the engine in order to be burnt therein. Moreover, hybrid vehicles were developed in order to reduce fuel consumption and emissions of exhaust gases, which makes the engine management for burning the fuel vapours coming from the canister more complex, or even impossible, without deteriorating the engine performance.

Therefore, the fuel tanks of these engines are generally pressurized (typically to a pressure of around 300-400 mbar) in order to limit loading of the canister, which is generally carried out by a functional element located after the ventilation valves, known as an FTIV (Fuel Tank Isolation Valve). This element comprises a safety valve (calibrated to the maximum working pressure of the tank) and an electric control in order to be able to bring the tank to atmospheric pressure before filling. As a result, these tanks must have, compared to the fuel tanks of conventional combustion engines, an improved mechanical strength, in particular in the case of plastic tanks.

The solution currently on the market consists of a metal tank of sizeable thickness, which considerably increases the weight of the tank and thus increases the fuel consumption and the exhaust gas emissions.

Other known solutions to the aforementioned pressure problem may consist of an increase of the wall thickness of plastic tanks and/or in the use of internal reinforcements (rods, partitions, etc.) connecting the two walls together, but these solutions generally adversely affect the weight, reduce the working volume of the tank and increase the cost of the tank. Another solution may consist in providing the tank with kiss points (i.e. local welds of the lower wall and of the upper wall), but this solution leads to a reduction of the working volume of the tank.

Another solution is that described in U.S. Pat. No. 5,020,687 which consists in attaching a reinforcing fabric to the outer wall of the tank, this attachment taking place by overmoulding said fabric during the manufacture of the tank by extrusion-blow moulding, the fabric being introduced into the mould prior to the introduction of the parison which, after blow moulding, will form the tank.

However, this solution has the major drawback that, as a result of the difference in thermal contraction (during cooling) between the wall of the tank and the reinforcing fabric, creases are created in said fabric, which phenomenon is not only capable of creating stress concentration zones but also zones where the tank comes closer to the vehicle body, which may lead in certain cases to having to provide a larger space for the attachment of the latter to the vehicle. Another drawback of the solution is that the fabric is in contact with the cold wall of the mould. This results in more difficult fusion of the wall of the fabric in contact with the parison and therefore less effective overmoulding, or even cold welding (bonding).

One subject of the present invention is therefore a process that makes it possible to obtain a fuel tank that has good long-term mechanical strength without suffering from the aforementioned drawbacks.

The present invention therefore relates to a process for manufacturing a fuel tank comprising a thermoplastic wall and a fibrous reinforcement on at least one portion of its outer surface, according to which:
- a molten thermoplastic parison is moulded in a mould and is left to cool in order to obtain the wall of the tank;
- a fibrous reinforcement is chosen that comprises a thermoplastic similar to or compatible with that of the wall of the tank and this reinforcement is heated so as to soften or even melt the thermoplastic of the reinforcement; and
- the reinforcement is applied to the outer surface of the tank by exerting a force that makes it possible to weld the two elements.

The fuel for which the tank according to the invention is intended may be petrol, diesel, a biofuel, etc. and may have an alcohol content of 0 to 100%.

According to the invention, the tank is made of a thermoplastic.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, non-limitingly, random copolymers, linear block copolymers, non-linear block copolymers, and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersity of their molecular weight.

In particular, polyolefins, thermoplastic polyesters, polyketones, polyamides and copolymers thereof may be used. A blend of polymers or copolymers may also be used, as may a blend of polymer materials with inorganic, organic and/or natural fillers such as, for example, but non-limitingly, carbon, clays, salts and other inorganic derivatives, natural fibres or polymeric fibres. It is also possible to use multilayer structures consisting of stacked layers bonded together, comprising at least one of the polymers or copolymers described above.

One polymer often employed is polyethylene. Excellent results have been obtained with high-density polyethylene (HDPE).

The wall of the tank may be composed of a single thermoplastic layer, or of two layers. One or more other possible additional layers may, advantageously, be composed of layers made of a material that is a barrier to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The tank according to the invention preferably comprises an EVOH-based barrier layer located between HDPE-based outer layers.

The fibrous reinforcement may be in many forms; it is generally a sheet comprising chopped fibres or long fibres or continuous fibres, which fibres may or may not be woven. Generally, the chopped fibres have final lengths of a few tens/hundreds of microns. For long fibres, the residual lengths are a few millimeters. When the length of the fibres used is several tens of centimeters, these fibres are referred to as continuous fibres or continuous filaments. Continuous fibres are preferred, and in particular continuous fibres that are non-woven and randomly distributed (fibres referred to as multidirectional fibres). While being less expensive than woven long fibres, these have the advantage of distributing the stresses more uniformly. They also have the advantage, within the context of the invention, of having a lower density of fibres, i.e. a higher proportion of voids that are advantageously filled with thermoplastic in order to facilitate the welding.

These fibres may be based on glass, on carbon, on a polymer (such as a polyamide, for example an aromatic polyamide such as an aramid), or may even be natural fibres such as hemp or sisal. They are preferably glass fibres (of E-glass, S-glass or other glass type). The fibres of the fibrous reinforcement according to the invention are preferably compatible with the thermoplastic and therefore, generally, compatible with polyolefins and, in particular, with HDPE. In order to obtain this compatibility, the fibres may be sized (surface-treated) with a compatibilizing substance such as a silane. A reactive HDPE-type binder may also be used. Within this context, reactive functional groups of maleic anhydride type may advantageously be used.

According to the invention, the fibrous reinforcement comprises a thermoplastic that is compatible with that of the tank, or even identical thereto. In the case of fuel tanks, this is generally polyethylene and in particular HDPE. The fibre content in the reinforcement is at least 30%, preferably at least 40% or even at least 45%. The thermoplastic is preferably melted around/in the bulk of the fibres so as to form a homogeneous sheet/plate having thermoplastic on at least one portion of its surface so as to facilitate welding. In practice, this can be achieved by compression moulding, injection moulding, spray moulding, vacuum moulding or else calendering. Preferably, the process for producing the reinforcement will be compression moulding or spray moulding. Mats with randomly distributed continuous fibres give good results with this method. In particular, the CFM (Continuous Filament Mat) product from the company 3B comprising Advantex® glass fibres gives good results. This type of mat comprises one or more layer(s) of these fibres, which are distributed randomly, sized with a silane and assembled using a binder.

According to one particularly preferred variant, the reinforcement covers at least one portion of a zone to which a component is attached (for example: the filler neck to which the filler pipe is attached) and includes a barrier layer so that it performs both a reinforcing role (in this often fragile zone) and an impermeabilization role. In this variant, the reinforcement is advantageously obtained by compression moulding a multilayer sheet that includes a barrier layer (and preferably, a sheet comprising an EVOH layer between two HDPE layers), a mat of fibres (preferably randomly distributed, non-woven, continuous glass fibres) and an HDPE sheet.

The size of the reinforcement used in the invention is adapted to facilitate the preheating thereof and the welding thereof to the wall of the tank, while ensuring a high-performance reinforcing effect. Its surface area is in the range of the tens of cm$^2$ (typically between 50 and 500 cm$^2$, or even between 100 and 300 cm$^2$) or alternatively, according to one advantageous variant of the invention which will be described in detail later on, the reinforcement may cover the entire outer surface of the tank and, in a way, envelop it. The thickness of this reinforcement is preferably between 0.1 and 2 mm, or even between 0.2 and 1 mm. In order for the reinforcement to be mechanically effective, its tensile strength is at least 2000 MPa, or even at least 3000 MPa; in certain cases, it may even be advantageous to have a strength of at least 5000 MPa, or even 10 000 MPa.

According to one advantageous variant of the invention, the reinforcement comprises openings (holes) so as to avoid occlusions of air between said reinforcement and the wall of the tank. The dimension of these openings may typically be in the mm range.

The moulding operation that can be used for the manufacture of the tank in accordance with the invention may be of any nature, as long as it comprises the use of a mould that gives the shape of the tank to a parison (molten thermoplastic preform that is generally extruded and has a cylindrical shape and/or that is in the form of cylindrical parison halves and/or sheets).

The moulding operation may also be coupled, in particular, to a blow moulding and/or thermoforming operation. It may also be followed by a subsequent assembly step, especially by welding. If the moulding operation is carried out starting from a parison, this parison may be obtained, in particular, by coextrusion or coinjection moulding.

Very good results have been obtained using moulding by coextrusion-blow moulding, moulding by coinjection moulding-welding or else moulding by thermoforming. Preferably, the tank is produced by coextrusion-blow moulding. In this case, it is possible equally well to use a continuous extrusion technique, an accumulating extrusion technique or a sequential extrusion technique, all techniques that are well known to those skilled in the art.

According to the invention, once the parison is moulded to the shape of the tank, it is left to cool, preferably down to a temperature such that the dimensional stability of the wall is attained. Generally, this is substantially the ambient temperature, no particular conditioning being necessary (except perhaps for accelerating the cooling). One way of achieving this in practice consists in leaving the tank to cool in a dimensional stabilization frame, also known as a "post-blowing" frame, in which it is prevented from deforming, for a duration in the range of the minutes, in general (typically from 2 to 6 min).

Furthermore, the welding of the reinforcement to the wall of the tank may or may not take place in line with the moulding of the tank. In other words, the moulded tank may be stored before welding the reinforcement. This variant has the advantage of an ensured dimensional stability and a sufficient wall stiffness.

Preferably, according to a first variant of the invention, during or after the moulding of the wall of the tank, this wall is provided with at least one compression-resistant zone (covering at least one zone of the tank with a large deformation (when it is put under pressure and/or under vacuum)) included (at least partially) in the welding zone of the reinforcement, or located in the vicinity thereof, in order to be able to withstand the force linked to the pressure exerted during the welding. Generally, this zone consists of a wall portion that is of greater thickness and/or that is between at least two elements (accessories) connecting the lower and upper wall portions of the tank (i.e. respectively that constituting the bottom and the top of the tank when the latter is mounted on the vehicle). These elements may, for example, comprise the substantially vertical wall portion of the tank when the latter is mounted on the vehicle; a pump-gauge module; a "kiss point" (or local weld of the lower and upper walls of the tank), and in particular, one of the points described in Application EP 09175263.4 in the name of the Applicant and incorporated by reference in the present application; and/or a hollow reinforcing pillar, optionally integrating an active function as described in Application FR 0952651 in the name of the Applicant and incorporated by reference in the present application also.

The subvariant according to which the reinforcement is welded in a zone comprising at least one reinforcing pillar is preferred. Another subvariant which is preferred is that where the use of a mat is combined with the presence of rib(s), which makes increased reinforcement possible. The use of angular shapes for the rib(s) will be avoided in order to ensure that the mat follows the contours of the surface.

Also preferably, according to a second variant of the invention (that can optionally be combined with the first), the fibrous reinforcement is put under tension and applied under tension to the surface of the tank. This variant gives good results when a large portion (more than half), or even all, of the surface of the tank is covered by the fibrous reinforcement, or by several fibrous reinforcements. For putting the reinforcement under tension, it is possible to use holding clamps similar to those used in drawing or a clamping frame similar to that used in thermoforming. In this variant, the application of the fibrous reinforcement to the tank preferably takes place after heating the reinforcement, this preferably being put under tension before it is heated.

Also preferably, according to a third variant of the invention (that can optionally be combined with one or both of the others), the tank is used to exert a pressure on the reinforcement and thus to carry out compression welding. The idea would be to use the tank as a thermoforming mould, to the surface of which the previously heated/melted fibrous reinforcement would be welded. Such a process preferably takes place in various steps: i) fastening the fibrous reinforcement to a support or in clamps; ii) heating/melting of the thermoplastic of the fibrous reinforcement; iii) thermoforming of the reinforcement using the tank as a cavity.

According to the invention, the reinforcement and/or the surface of its tank welding zone are preheated before carrying out the welding. Among existing heating techniques, mention may be made, non-limitingly, of:

rotational heating;
vibrational heating;
ultrasonic heating;
induction heating;
microwave heating;
heating via heating resistors;
heating using a heated metal block;
hot gas heating;
infrared heating;
laser heating.

These techniques are very suitable since they make it possible to heat the wall of the tank on the surface while avoiding overheating the core, which would have the drawback of creating too large a deformation after the welding operation.

By placing the reinforcement close to its tank welding surface during the preheating operation, this type of heat source, applied through the reinforcement, makes it possible to heat both the reinforcement and the surface of the tank.

The preheating temperature will depend on the technique used. It is preferable for the temperature to be high enough to guarantee the melting of the HDPE. It is therefore necessary to bring the HDPE to a temperature above 135° C. and preferably above 150° C. or even 180° C.

According to the invention, the reinforcement is welded to a portion of the outer surface of the tank after having been preheated. This welding may be carried out by virtue of the use of a welding tool. This tool preferably comprises both a heat source and a means of applying pressure to the weld and/or tension to the reinforcement. The heat source may be the same as that used to preheat the elements to be welded.

Thus, according to one variant of the invention, the procedure below is followed in order to preheat and weld the reinforcement and the surface portion of the tank:

the reinforcement is fastened in or to the preheating and welding tool;

the assembly is positioned perpendicular to the tank welding zone;

the reinforcement and optionally the surface of said zone are preheated through the tool;

the reinforcement is welded to this surface by applying pressure using the tool (for example: use of a diaphragm or of a foam as tool can be made) and/or by applying pressure to this zone from the inside of the tank. This pressure may be exerted by direct mechanical contact (contact pressure) during or after the welding and/or by using compressed air.

The use of a diaphragm or of a foam makes it possible to compensate for the dimensional variations of the surface of the tank (typically of the range of 3 to 5 mm) generally present after the blow moulding process, and to exert, despite them, a uniform pressure on this surface. In the case of a diaphragm, it will also be ensured that the air between the diaphragm and the reinforcement is evacuated in order to guarantee the uniformity of the welding pressure. This air may be evacuated by integrating vacuum suction into the reinforcement gripping tool, outside of the edge of the reinforcement. In order to compensate for the dimensional variations obtained on a blow-moulded tank, the sealing for this suction is created using a flexible element. This flexible element may be: a foam, a sheet of silicone, etc.

Generally, irrespective of the variant(s) of the invention envisaged, it is advantageous to evacuate the air which might be trapped between the reinforcement and the tank, precisely to guarantee the uniformity of the force.

According to one particular variant of the invention, the procedure below is followed in order to apply the reinforcement to the tank:

the reinforcement is deposited on a hot plate;
at the same time, the wall of the tank is preheated via infrared heating in the application zone of the reinforcement;
the reinforcement is gripped by a suitable tool;
the reinforcement is transferred and positioned on its tank application zone;
a force (preferably a homogeneous force) is applied to the whole of the welding zone or, sequentially, to various portions of the welding zone of the reinforcement.

The last variant is advantageous when the welding surface is large and could result in the tank being deformed too much if it was subjected, in one go and in its entirety, to the force required for the welding.

Furthermore, the welding of the reinforcement to the tank should not necessarily be carried out over its entire surface. It is possible, for example, to weld the edges and a few central zones only. However, advantageously, the welding takes place over substantially the entire surface, i.e. at least 90% of this surface, or even, ideally, 100%. For this purpose, in order to reduce the cycle time, it may be advantageous to provide several heating sources (multiple laser or IR heads, several jets of hot air, etc.), not necessarily of the same nature.

According to one advantageous variant of the invention, once the reinforcement is welded and before the material cools, the tank is put (back) into the aforementioned dimensional stabilization frame in order to prevent the welding zone from deforming as it cools.

The present invention also relates to a tank capable of being obtained by a process as described above and comprising a thermoplastic wall and a fibrous reinforcement welded to at least one portion of its outer surface, this fibrous reinforcement comprising a plastic that is of the same nature as or that is compatible with that of the outer surface of the tank, and randomly distributed continuous fibres. These are preferably glass fibres as described previously. The preferred variants described above within the context of the process according to the invention apply to the tank according to the invention.

The present invention also relates to the use of a tank (obtained by a process) as described above as a fuel tank for a hybrid vehicle. This tank may also be used in a conventional vehicle, where the reinforcing effect obtained may be taken advantage of to avoid the use of the metal straps that are generally used to prevent the creep of the lower wall of the tank when the tank is fastened to the bottom of the vehicle body. The presence of the reinforcement could also make it possible to reduce the thicknesses of the tank, giving rise to a reduction in the weight and an increase in the working volume.

It should also be noted that the reinforcing effect obtained by the subject of the invention may be combined with the use of other known reinforcements such as straps, kiss points, internal reinforcements (rods, partitions), overmoulded fabrics, etc. mentioned above and any other type of both internal and external reinforcement (all the more so since the first type makes it possible to contribute to obtaining a compression-resistant zone). The combination of the invention with these known techniques makes it possible to reduce the size and/or the amount of kiss points, internal reinforcements (rods, partitions), overmoulded fabrics, etc. Thus the weight of the final solution is minimized and the working volume of the tank is maximized.

Figure 1:
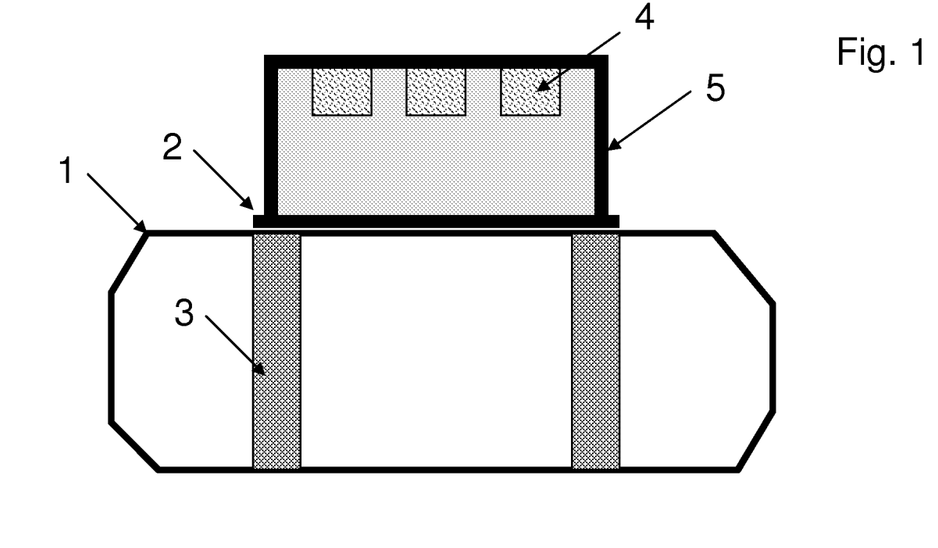
FIG. 1: a tank and an IR radiation or laser welding tool equipped with a reinforcement.

The present invention is illustrated, non-limitingly, by appended FIGS. 1 to 7 which schematically represent:

FIG. 1 shows how a welding and preheating tool (5) equipped with a fibrous reinforcement (2) and comprising infrared heating elements (4) is positioned perpendicular to a surface zone of the wall of a tank (1), which surface zone is between two reinforcing pillars (3).

Figure 2:
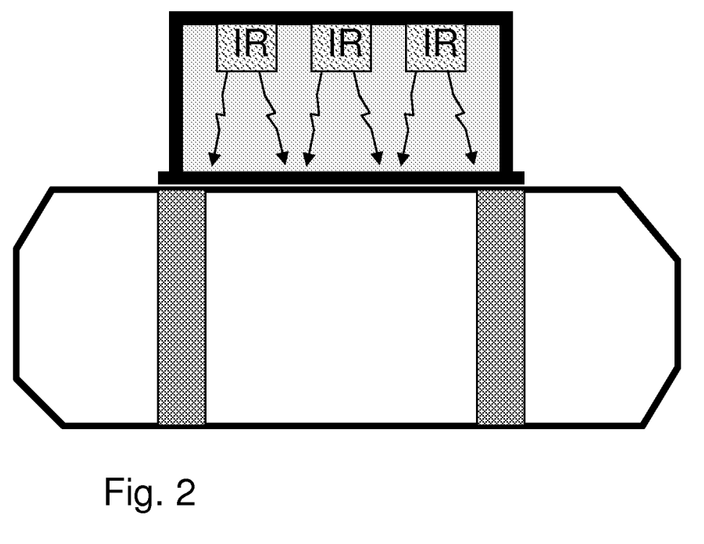
FIG. 2: the welding by the tool.

In FIG. 2, it is possible to see the radiation emitted by the elements (4) onto the reinforcement (2), the thickness of which is such that it allows a fraction of said radiation to pass through, and by so doing also makes it possible to heat the welding surface of the wall of the tank (1). The tool exerts a pressure at the same time, so as to gradually carry out the welding.

Figure 3:
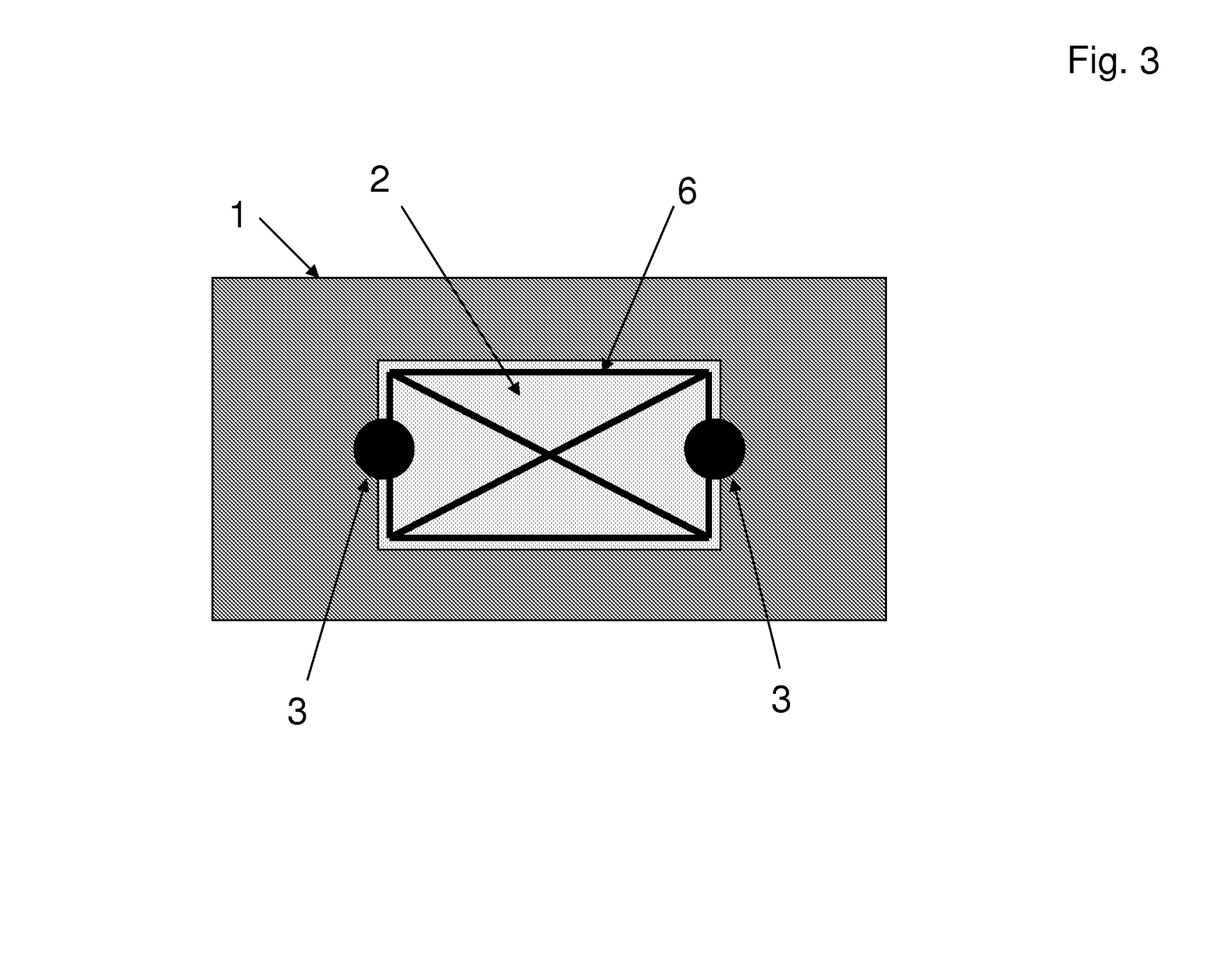
FIG. 3: a top view of the result of the welding.

In FIG. 3, it is possible to see the weld lines (6) obtained by virtue of the use of multiple, suitably distributed, sources of radiation.

Figure 4:
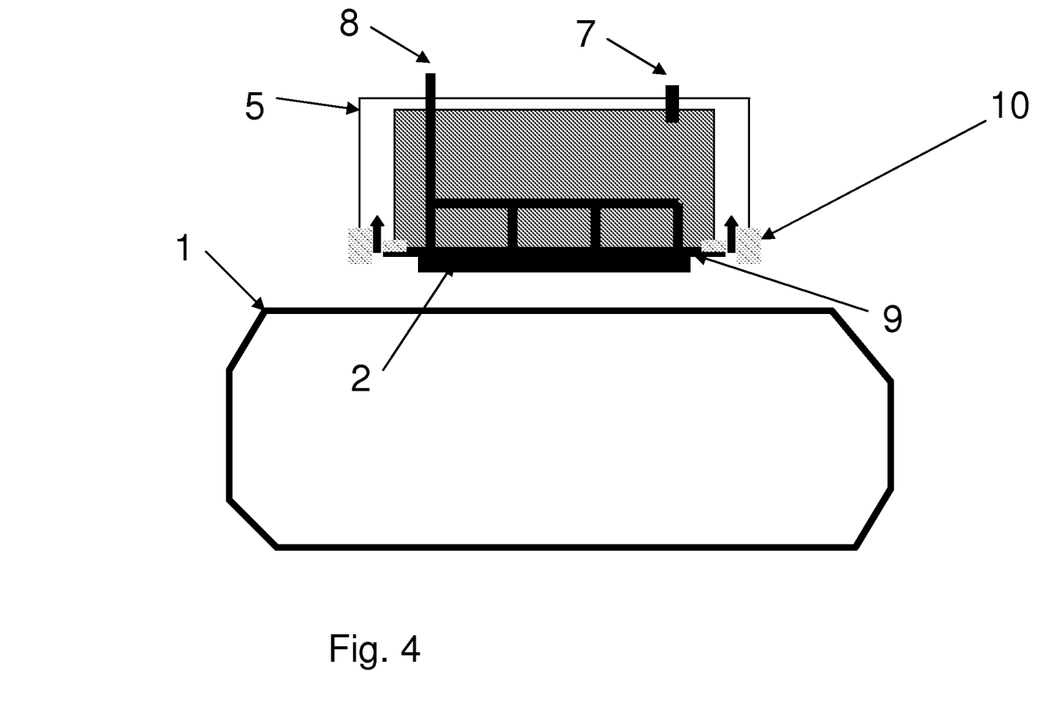
FIGS. 4 to 6: a variant of the process according to the invention using a gripping tool with a diaphragm.
Figure 5:
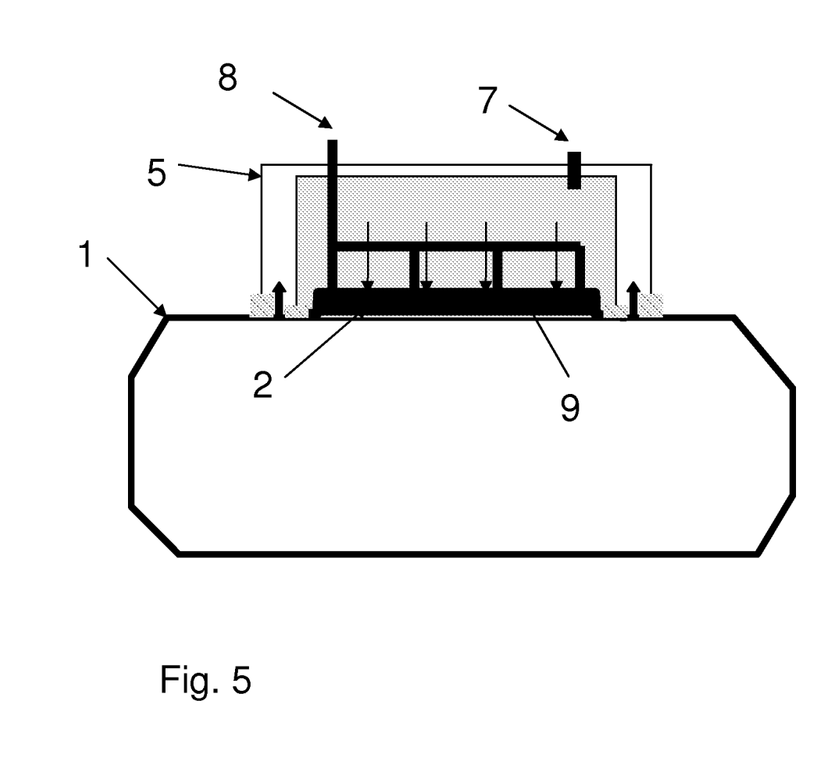
Figure 6:
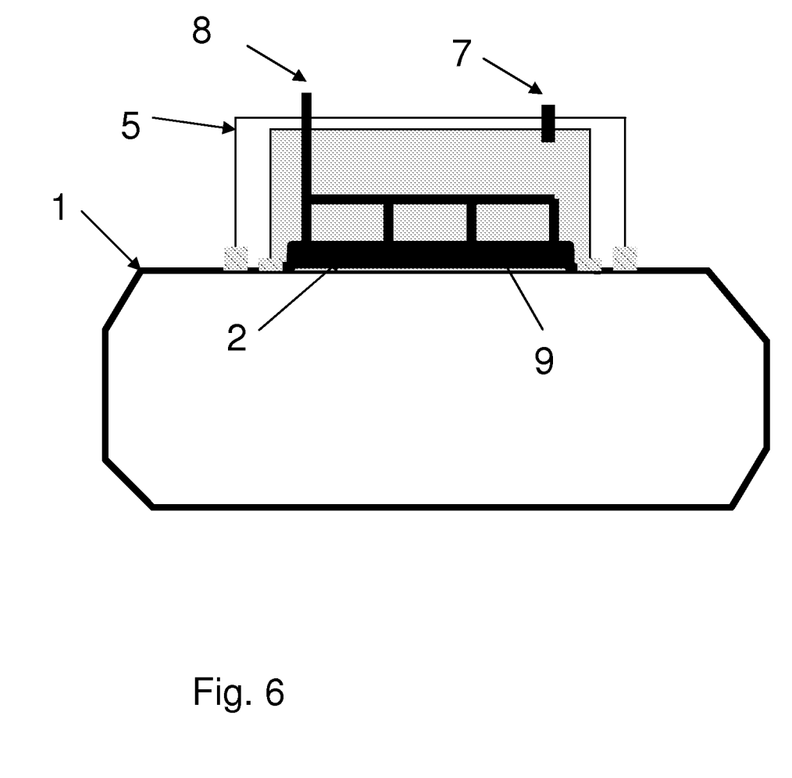
Figure 7:
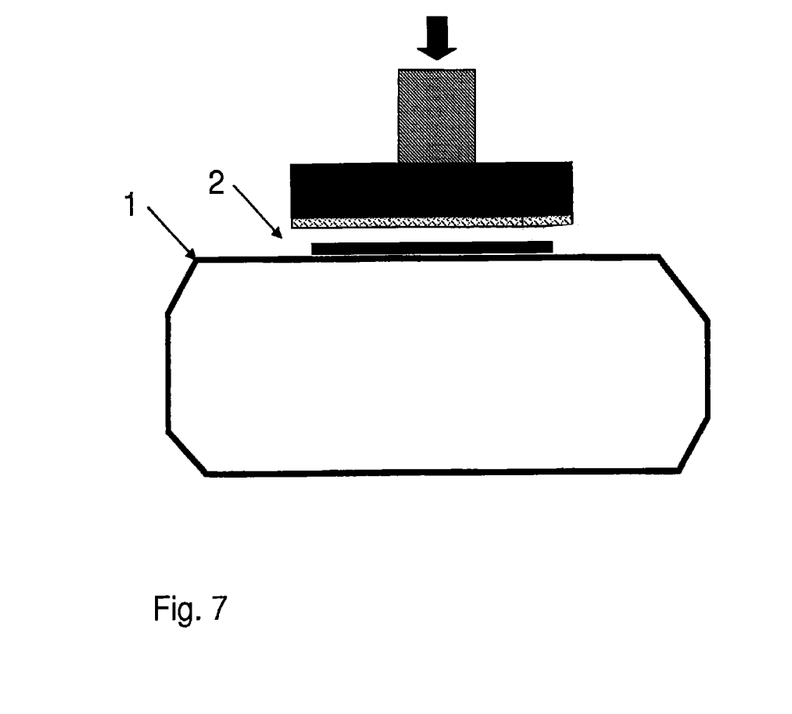
FIG. 7: a variant of the process according to the invention using a gripping tool with a foam.

FIGS. 4 to 6 show respectively:

FIG. 4: how a gripping tool (5) with a diaphragm (9) grips the reinforcement (2) by vacuum suction through the system of lines (8), while evacuating the air between the diaphragm and the reinforcement (in the direction indicated by the arrows) in order to guarantee the uniformity of the welding pressure in the next step (FIG. 5). The sealing for this suction is created using a flexible element (10).
FIG. 5: how the welding force is applied by blowing compressed air through the pipe (7).
FIG. 6: the release of all the pressures and vacuum to be able to then remove the tool (5).

The invention claimed is:

1. A process for manufacturing a fuel tank including a thermoplastic wall and a fibrous reinforcement on at least one portion of its outer surface, the process comprising:
    molding a molten thermoplastic parison in a mold and leaving the molten thermoplastic parison to cool to obtain a wall of the tank;
    choosing a fibrous reinforcement that has a fiber content of at least 30% and a tensile strength of at least 2000 MPa and that includes a thermoplastic of a same nature as or compatible with that of the wall of the tank and heating the reinforcement to soften or even melt the thermoplastic of the reinforcement; and
    then applying the reinforcement to an outer surface of the tank by exerting a force that makes it possible to weld the reinforcement and the outer surface,
    wherein welding takes place over at least 90% of the surface of the fibrous reinforcement.

2. A process according to claim 1, wherein during or after the molding of the tank wall, the tank wall is provided with at least one compression-resistant zone being included at least partly in a welding zone of the reinforcement, or located in a vicinity thereof.

3. A process according to claim 2, wherein the compression-resistant zone includes a wall portion that is of greater thickness and/or that is between at least two elements connecting lower and upper wall portions of the tank.

4. A process according to claim 3, wherein the reinforcement is welded in a zone comprising at least one reinforcing pillar.

5. The process according to claim 3, wherein use of a mat is combined with presence of at least one rib.

6. A process according to claim 1, wherein the reinforcement is put under tension and applied under tension to the surface of the tank.

7. A process according to claim 6, wherein more than half of the surface of the tank is covered by the reinforcement or by plural fibrous reinforcements.

8. A process according to claim 1, wherein the tank is used to exert pressure on the reinforcement and thus to carry out compression welding.

9. The process according to claim 1, using a welding and preheating tool, and further comprising:
fastening the reinforcement in or to the tool;
positioning an assembly perpendicular to the tank welding zone;
preheating the reinforcement, or the reinforcement and the surface of the zone, through the tool;
welding the reinforcement to the surface by applying pressure using the tool and/or by applying pressure to the zone from inside of the tank.

10. A process according to claim 1, wherein plastic of the wall of the tank and of the reinforcement is high density polyethylene (HDPE).

11. A process according to claim 1, wherein the fibers of the reinforcement are randomly distributed continuous fibers.

12. A process according to claim 1, wherein the fibers of the reinforcement are glass fibers.

13. A process according to claim 10, wherein the reinforcement covers at least one portion of a zone where a component is attached and is obtained by compression molding a multi-layer sheet including an EVOH layer between two HDPE layers; a mat of randomly distributed, non-woven, continuous glass fibers; and an HDPE sheet.

14. A process according to claim 1, further comprising evacuating any air trapped between the reinforcement and the tank.

15. A process according to claim 1, wherein the reinforcement comprises openings or holes.

16. A process according to claim 1, wherein once the reinforcement is welded, the tank is put into a dimensional stabilization frame.

17. A tank comprising a thermoplastic wall and a fibrous reinforcement welded to at least one portion of its outer surface, the fiber content in the fibrous reinforcement being at least 30%, this fibrous reinforcement comprising a thermoplastic that is of a same nature as or is compatible with that of the outer surface of the tank, and randomly distributed continuous fibers, wherein the fibrous reinforcement is welded to the thermoplastic wall over at least 90% of the surface of the fibrous reinforcement.

18. A tank according to claim 17, wherein the fibers of the reinforcement are glass fibers.

19. A tank according to claim 18, wherein the reinforcement covers at least one portion of a zone where a component is attached and is obtained by compression molding a multi-layer sheet comprising an EVOH layer between two HDPE layers; a mat of randomly distributed, non-woven, continuous glass fibers; and an HDPE sheet.

20. A tank according to claim 17, wherein said tank is a hybrid vehicle fuel tank.

21. A process according to claim 1, wherein the surface area of the fibrous reinforcement is between 50 and 500 cm$^2$.

22. A process according to claim 21, wherein the surface area of the fibrous reinforcement is between 100 and 300 cm$^2$.

23. A process according to claim 1, wherein a thickness of the fibrous reinforcement is between 0.1 and 2 mm.

* * * * *